(12) United States Patent
Lin et al.

(10) Patent No.: US 10,210,839 B2
(45) Date of Patent: Feb. 19, 2019

(54) PIXEL STRUCTURE, ARRAY SUBSTRATE AND METHOD FOR CONTROLLING THE SAME, AND DISPLAY DEVICE

(71) Applicant: BOE TECHNOLOGY GROUP CO., LTD., Beijing (CN)

(72) Inventors: Chia-Chiang Lin, Beijing (CN); Wei Wei, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/122,612

(22) PCT Filed: Jun. 30, 2015

(86) PCT No.: PCT/CN2015/082924
§ 371 (c)(1),
(2) Date: Aug. 30, 2016

(87) PCT Pub. No.: WO2016/119396
PCT Pub. Date: Aug. 4, 2016

(65) Prior Publication Data
US 2017/0069287 A1 Mar. 9, 2017

(30) Foreign Application Priority Data
Jan. 30, 2015 (CN) .......................... 2015 1 0051246

(51) Int. Cl.
*G09G 3/00* (2006.01)
*G02B 27/22* (2018.01)
(Continued)

(52) U.S. Cl.
CPC ......... *G09G 5/003* (2013.01); *G02B 27/2214* (2013.01); *G09G 3/003* (2013.01);
(Continued)

(58) Field of Classification Search
CPC ...... G09G 5/003; G09G 3/003; G09G 3/2003; G09G 2300/0426; G09G 2300/0439;
(Continued)

(56) References Cited

U.S. PATENT DOCUMENTS

2013/0257925 A1   10/2013   Kim et al.

FOREIGN PATENT DOCUMENTS

CN   102338951 A   2/2012
CN   102547331 A   7/2012
(Continued)

OTHER PUBLICATIONS

Chinese Office Action dated Dec. 26, 2016, for corresponding Chinese Application No. 201510051246.6.
(Continued)

*Primary Examiner* — Stephen G Sherman
(74) *Attorney, Agent, or Firm* — Kinney & Lange, P.A.

(57) ABSTRACT

Embodiments of the disclosure relate to a pixel structure for naked-eye stereoscopic display, which comprises: a main display region; and at least one crosstalk region. The main display region and the crosstalk region are configured such that brightness of the main display region and brightness of the crosstalk region are controlled separately. Embodiments of the disclosure also relate to an array substrate for use with an inclined optical grating, and a method for controlling the pixel structure of the array substrate.

16 Claims, 5 Drawing Sheets

(51) Int. Cl.
  *G09G 5/00*  (2006.01)
  *G09G 3/20*  (2006.01)
  *H04N 13/317*  (2018.01)
  *H04N 13/351*  (2018.01)
  *H04N 13/31*  (2018.01)
  *H04N 13/398*  (2018.01)

(52) U.S. Cl.
  CPC ......... *G09G 3/2003* (2013.01); *H04N 13/317* (2018.05); *H04N 13/351* (2018.05); *G09G 2300/0426* (2013.01); *G09G 2300/0439* (2013.01); *G09G 2300/0443* (2013.01); *G09G 2300/0452* (2013.01); *G09G 2310/0202* (2013.01); *G09G 2310/0262* (2013.01); *G09G 2320/0209* (2013.01); *G09G 2320/0214* (2013.01); *G09G 2320/0626* (2013.01); *G09G 2320/0686* (2013.01); *H04N 13/31* (2018.05); *H04N 13/398* (2018.05)

(58) Field of Classification Search
  CPC ... G09G 2300/0443; G09G 2300/0452; G09G 2310/0202; G09G 2310/0262; G09G 2320/0209; G09G 2320/0214; G09G 2320/0626; G09G 2320/0686; G02B 27/2214; H04N 13/0415; H04N 13/0447; H04N 13/0409; H04N 13/0497; H04N 13/317; H04N 13/351; H04N 13/31; H04N 13/398
  USPC ........................................................ 345/694
  See application file for complete search history.

(56) References Cited

FOREIGN PATENT DOCUMENTS

| | | |
|---|---|---|
| CN | 103609107 A | 2/2014 |
| CN | 103995376 A | 8/2014 |
| CN | 204178082 U | 2/2015 |
| CN | 104581131 A | 4/2015 |

OTHER PUBLICATIONS

First Chinese Office Action dated Nov. 6, 2015, for corresponding Chinese Application No. 201510051246.6.
International Search Report and Written Opinion dated Sep. 30, 2015, for corresponding PCT Application No. PCT/CN2015/082924.

PIXEL STRUCTURE, ARRAY SUBSTRATE AND METHOD FOR CONTROLLING THE SAME, AND DISPLAY DEVICE

TECHNICAL FIELD

Embodiments of the present disclosure relate to the field of naked-eye stereoscopic display technologies, and specially, to a pixel structure for a naked-eye stereoscopic display, an array substrate for use with an inclined optical grating, a display device having the array substrate, and a method for controlling the array substrate for naked eye stereoscopic display.

BACKGROUND

Figure 1:
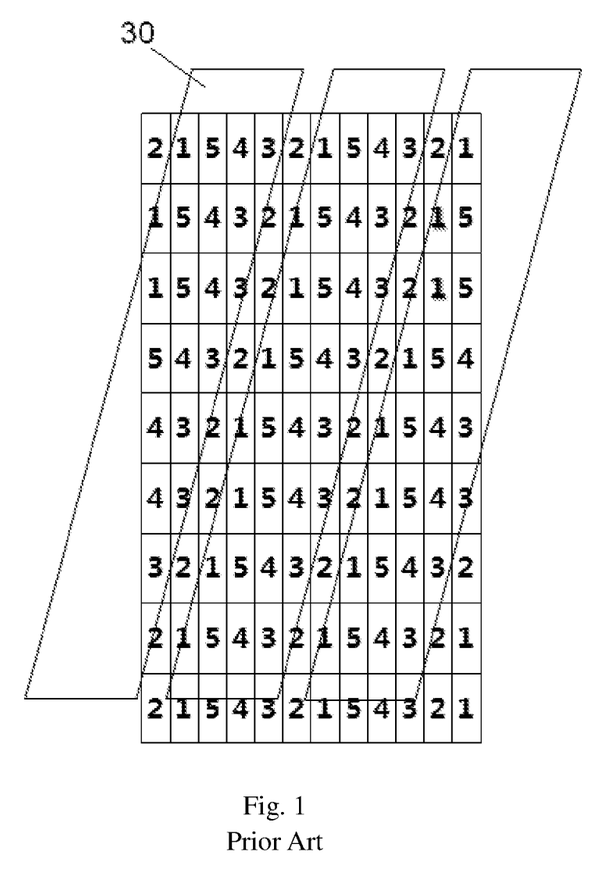
FIG. 1 is a schematic view showing a crosstalk between images according to a naked-eye stereoscopic display technology in prior art, which is described by taking an optical parallax shielding optical grating as an example.

To reduce Moire fringes and reduce discomfort generated due to blind zone of viewing, naked-eye stereoscopic display technologies in prior art usually adopt a design in which a pattern of images displayed by pixels is arranged in an inclined manner. In such a manner, a direct crosstalk between different images will be generated at a partial region of the pixels. FIG. 1 is a schematic view showing a crosstalk between images according to a naked-eye stereoscopic display technology in prior art, which is described by taking an optical parallax shielding optical grating as an example. As shown in FIG. 1, in a certain viewing angle, an image of a picture 2 is mainly displayed through an optical device (for example, an inclined optical grating 30). However, images of some of pixels of pictures 1, 3 may also be displayed through the inclined optical grating 30. Thus, a crosstalk between the picture 2 and the pictures 1 and 3 may occur.

Such a crosstalk will result in an image blurring when there is a relative large outburst effect during a stereoscopic display, thereby performance of stereoscopic display and comfort level of watching are reduced.

SUMMARY

The present invention has been made to reduce crosstalk between images in a naked-eye stereoscopic display.

According to an aspect of the present invention, there is provided a pixel structure for naked-eye stereoscopic display According to an exemplary embodiment of the pixel structure, the pixel structure may comprise a main display region and at least one crosstalk region, wherein the main display region and the crosstalk region are configured such that brightness of the main display region and brightness of the crosstalk region are controlled separately.

According to another exemplary embodiment of the pixel structure, the pixel structure may be approximately in a shape of a rectangle; the crosstalk region may comprise at least one of four corners of the rectangle; and the crosstalk region may have a shape of a right angled triangle.

According to another exemplary embodiment of the pixel structure, the brightness of the main display region and the brightness of the crosstalk region of the pixel structure may be controlled by two data lines respectively.

According to another exemplary embodiment of the pixel structure, the brightness of the main display region and the brightness of the crosstalk region of the pixel structure may be controlled by two gate lines respectively.

According to another aspect of the present invention, there is provided an array substrate for use with an inclined optical grating.

According to an exemplary embodiment of the array substrate, the array substrate may comprise: a base substrate; a plurality of data lines and a plurality of gate lines; and an array of sub-pixels formed by a plurality of sub-pixels arranged on the base substrate, at least one sub-pixel having the pixel structure according to claim 1. The pixel structure may be approximately in a shape of a rectangle, the crosstalk region may comprise at least one of four corners of the rectangle and has a shape of a right angled triangle, and the pixel structure may be configured such that a hypotenuse of the right angled triangle is orientated in a direction that is the same as an inclining direction of the inclined optical grating.

According to an exemplary embodiment of the array substrate, the brightness of the main display region and the brightness of the crosstalk region of each pixel structure may be controlled by two corresponding ones of the data lines respectively.

According to an exemplary embodiment of the array substrate, the brightness of main display regions and the brightness of crosstalk regions of pixel structures of sub-pixels arranged in one row of the array which is in parallel with the gate lines may be controlled by two corresponding ones of the gate lines, respectively.

According to a further aspect of the present disclosure, there is provided a display device, which comprises the array substrate according to any one of the above embodiments.

According to a still further aspect of the present disclosure, there is provided a method for controlling an array substrate for naked-eye stereoscopic display.

According to an exemplary embodiment of the method, the array substrate comprises an array formed of pixel structures of a plurality of sub-pixels, the method may comprise steps of: dividing each of at least a part of the pixel structures of the array into a main display region and a crosstalk region based on an arrangement requirement for stereoscopic display; and controlling brightness of the main display region and brightness of the crosstalk region separately.

According to another exemplary embodiment of the method, the step of controlling brightness of the main display region and brightness of the crosstalk region separately may comprise: controlling the brightness of the main display region and the brightness of the crosstalk region of the corresponding pixel structure by two data lines respectively.

According to another exemplary embodiment of the method, the method may further comprise: keeping the crosstalk region of the pixel structure located within a dead region of stereoscopic viewing being turned on such that the crosstalk region is in a bright state.

According to another exemplary embodiment of the method, the step of controlling brightness of the main display region and brightness of the crosstalk region separately may comprise: controlling, by two gate lines respectively, the brightness of main display regions and the brightness of crosstalk regions of corresponding pixel structures of sub-pixels arranged in one row which is in parallel with the gate lines.

According to the technical solutions of the present disclosure, in a 3D display, through separating a region of a sub-pixel (i.e., the crosstalk region) where crosstalk between the sub-pixel and other sub-pixels may easily occur, from other regions of the sub-pixel and by separately controlling the main display region and the crosstalk region of the sub-pixel, the crosstalk region where crosstalk occurs between sub-pixels may be turned off, so as to prevent an adverse influence from the crosstalk region.

DETAILED DESCRIPTION OF PREFERRED EMBODIMENTS OF THE INVENTION

Exemplary embodiments of the present disclosure will be described hereinafter in detail with reference to the attached drawings, wherein the like reference numerals refer to the like elements. The embodiments of the present disclosure described in conjunction with the attached drawings should not be construed as being limited to the present disclosure; rather, these embodiments are provided to explain a general concept of the present disclosure.

As shown in FIGS. 2-6, the present disclosure provides a pixel structure for a sub-pixel, comprising a main display region 10 and at least one crosstalk region 20, brightness of the main display region 10 and brightness of the crosstalk region 20 being controlled separately. That is to say, based on a correspondence of position and orientation between an optical component (for example, a cylindrical lens, an optical parallax shielding optical grating, or an inclined optical grating) and the sub-pixel, the sub-pixel may be divided into the main display region 10 and the crosstalk region 20. The crosstalk region is a certain region where crosstalk may occur.

In a 3D display, separate controls of the main display region and the crosstalk region of the sub-pixel may be realized through separating a region (i.e., the crosstalk region) of the sub-pixel where a crosstalk with other sub-pixels tends to occur from the sub-pixel, and the crosstalk region of the sub-pixel where a crosstalk is generated may be turned off, so as to prevent an adverse influence from the crosstalk region.

Figure 2:
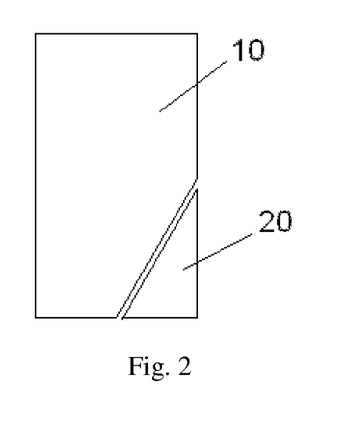
FIG. 2 is a schematic view showing a sub-pixel being divided into a main display region and a crosstalk region according to an exemplary embodiment of the present disclosure.

To reduce Moire fringes and reduce discomfort generated due to blind zone of viewing, a pattern of images displayed by sub-pixels are arranged in an inclined manner. Commonly used techniques include a 5-image arrangement, a 9-image arrangement, a 27-image arrangement and the like. The sub-pixels are arranged in an array on an array substrate. With an optical component (for example, an optical grating) disposed at an angle, the crosstalk region are usually formed at corner regions(s) of a rectangular sub-pixel. Depending on a position relation between each of the sub-pixels and the optical component, sizes and/or positions of the crosstalk regions of respective sub-pixels are different from each other. In FIG. 2, the sub-pixel is substantially in a rectangular shape, and the crosstalk region 20 is located at a corner of the sub-pixel. It is to be noted that, FIG. 2 only shows one way of determining a shape of the crosstalk region. The crosstalk region may have a shape of a triangle or a polygon similar to a triangle visually. In the exemplary embodiment of the present disclosure shown in FIG. 2, the crosstalk region is just located at a bottom right corner of the pixel. However, the crosstalk region may also be located at a top left corner of the pixel, or crosstalk regions may be located at both the bottom right corner and the bottom left corner. In other word, if necessary, the crosstalk regions may be located at one or more of the four corners of the sub-pixel.

Figure 3:
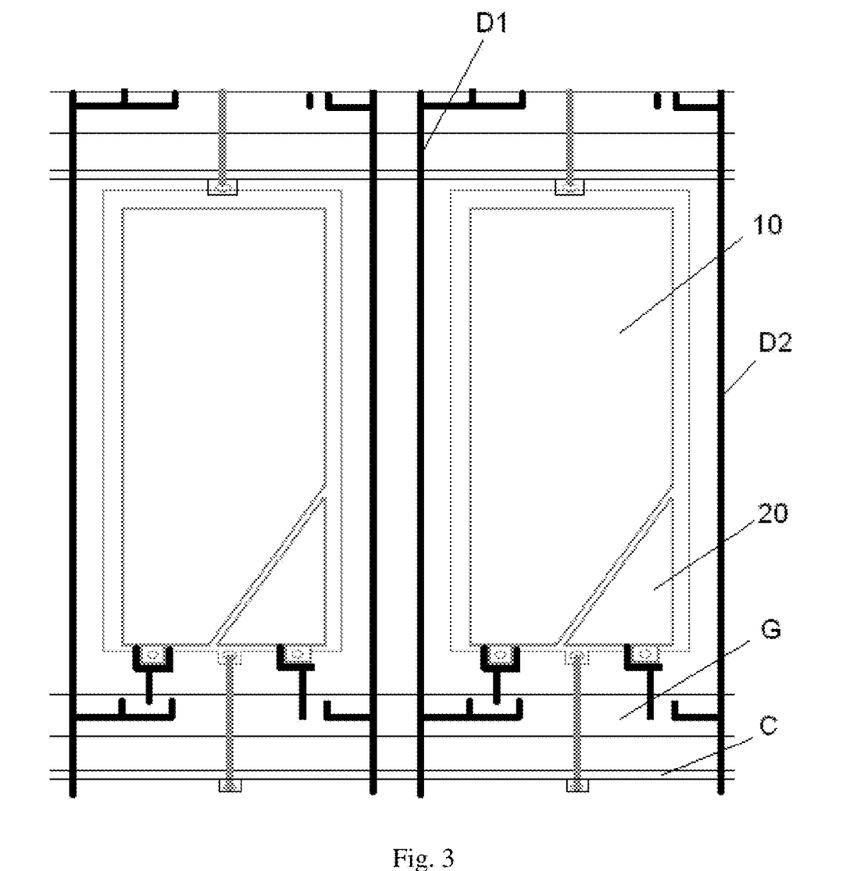
FIG. 3 is a schematic view showing a structure for controlling a pixel according to an embodiment of the present disclosure.

As shown in FIG. 3, brightness of the main display region 10 and brightness of the crosstalk region 20 of the sub-pixel are separately controlled through two data lines D1, D2. A common electrode line C is in communication with the crosstalk region 20 and the main display region 10. In a condition that a gate line G is turned on, the data lines D1, D2 communicates with the main display region 10 and the crosstalk region 20 respectively. Through controlling signal(s) on the data line D2, the crosstalk region 20 may be controlled to be in a dark state or not. In such a manner, the crosstalk region 20 of each sub-pixel or each crosstalk region 20 may be controlled separately, although an aperture opening ratio of the sub-pixel is reduced due to the addition of one more data line.

Figure 4:
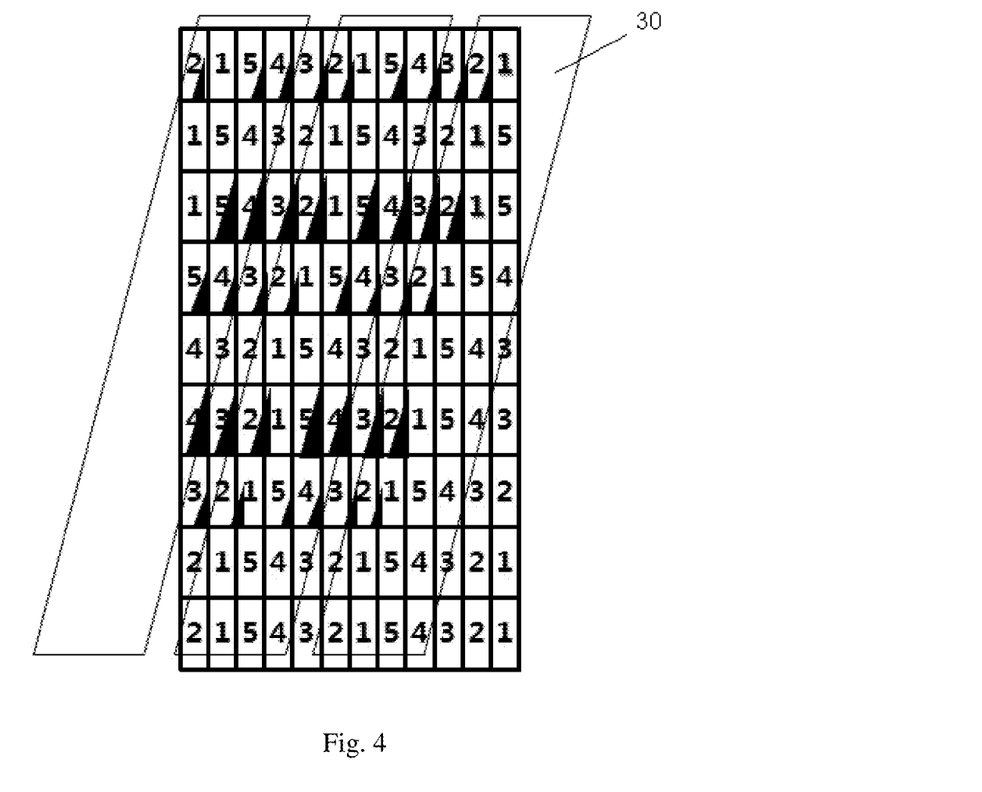
FIG. 4 is a schematic view showing a naked-eye stereoscopic display corresponding to the control structure of FIG. 3, taking a naked-eye stereoscopic display based on an optical parallax shielding optical grating as an example.

The shadowed portions or the dark portions shown in FIG. 4 correspond to crosstalk regions 20. FIG. 4 shows an example in which pixels 3 are shown. It is to be noted that, not every sub-pixel needs to be divided into a main display region and a crosstalk region, but the sub-pixel(s) that may be significantly influenced by crosstalk from adjacent sub-pixels (or images) needs to be provided with crosstalk region(s). Whether a crosstalk region is provided, and size, shape and position of the crosstalk region depend on an arrangement of images of the sub-pixels and orientation or position of the inclined optical grating 30. In FIG. 4, the shadowed crosstalk regions are turned off so as to be in a dark state, or the crosstalk regions between images having larger crosstalk are completely turned off to be in a dark state, such that images of adjacent sub-pixels 2 or 4 will not be presented in the picture of the sub-pixels 3.

It is also to be noted that, in the technical solutions of the present disclosure, not every sub-pixel needs to be separately provided with a crosstalk region. Based on the technical solutions of the present disclosure, even if only a part of the sub-pixels are provided with the separately controlled crosstalk region(s), performance of stereoscopic display and comfort level of watching can also be improved.

Figure 5:
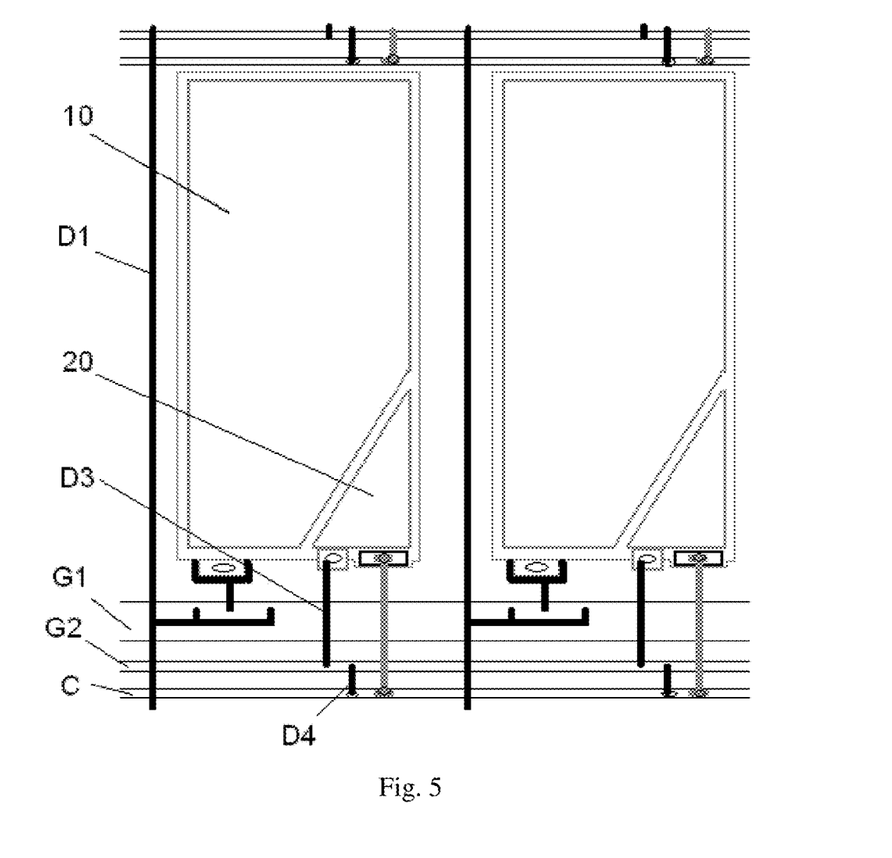
FIG. 5 is a schematic view showing a structure for controlling a pixel according to another embodiment of the present disclosure.

As shown in FIG. 5, in the sub-pixel, brightness of the main display region 10 and brightness of the crosstalk region 20 are separately controlled by utilizing two gate lines G1, G2. In a 3D mode, in accordance to the requirement of arrangement of images, turning on the gate line G2 for the crosstalk region may connect the crosstalk region with the voltage Vcom of the common electrode line, which may result in a dark region, such that brightness of an entire row of crosstalk regions arranged in a horizontal direction may be adjusted. Therefore, the entire row of crosstalk regions may be controlled simultaneously. For an image having relatively large crosstalk, the crosstalk regions may be adjusted to be dark regions (i.e., the crosstalk regions are turned off) to decrease the crosstalk. Specifically, as shown in FIG. 5, the data line D1 and the data line D3 are connected with the gate line G1, the data line D3 is also connected to the gate line G2, data line D4 is connected with the gate line G2 and the common electrode line C. When the gate line G1 is turned on, signal on the data line D1 is communicated to the main display region 10 and the crosstalk region 20, and at the same time, signal on the common electrode line C is communicated to the main display region 10 and the crosstalk region 20, and in this condition, both of the main display region 10 and the crosstalk region 20 are bright regions; after a certain period, for example, if the crosstalk region 20 needs to be turned to a dark region, the gate line G1 is turned off and the gate line G2 is turned on, such that the crosstalk region 20 is applied with the voltage Vcom of the common electrode line C via the data line D3, the gate line G2 and the data line D4, so as to turn the crosstalk region 20 into a dark region. With the control method of FIG. 5, the sub-pixel may have a relatively large aperture opening ratio compared to that utilizing the control method of FIG. 3, although brightness of crosstalk region of each sub-pixel cannot be controlled arbitrarily.

Figure 6:
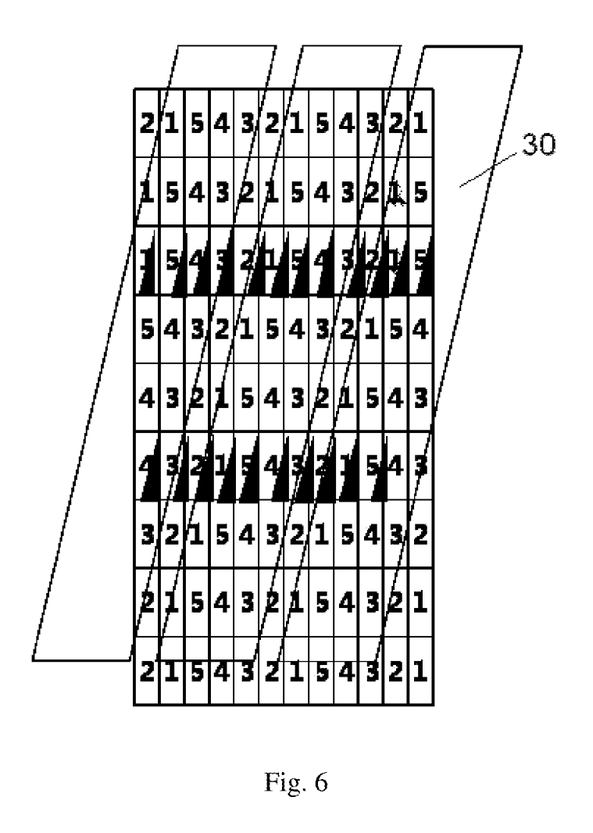
FIG. 6 is a schematic view showing a naked-eye stereoscopic display corresponding to the control structure of FIG. 5, taking a naked-eye stereoscopic display based on an optical parallax shielding optical grating as an example.

The shadowed portions or the dark portions shown in FIG. 6 correspond to crosstalk regions 20. FIG. 6 shows an example in which pixels 2 are shown. It is to be noted that, not sub-pixels in every row of sub-pixels need to be divided into main display regions and crosstalk regions, but sub-pixels in a row that may be significantly influenced by crosstalk from adjacent sub-pixels (or images) need to be provided with crosstalk regions. For example, in an up-and-down direction of FIG. 6, sub-pixels 2 of the first row of sub-pixels need not to be provided with crosstalk regions, because there is little crosstalk. Whether or not a crosstalk region is provided, and size, shape and position of the crosstalk region depend on an arrangement of images of the sub-pixels and orientation or position of the inclined optical grating. In FIG. 4, the shadowed crosstalk regions are turned off so as to be in a dark state, or the crosstalk regions between images having larger crosstalk are completely turned off to be in a dark state, such that images of adjacent sub-pixels 2 or 4 will not be presented in the picture of the sub-pixels 3. As an example, in FIG. 6, if crosstalk regions of sub-pixels 2 in the third and the sixth (counted from top to bottom) row of sub-pixels are relative larger, then crosstalk regions in these rows may be controlled separately from the control of the main display regions. Of course, in other embodiments that are not shown, not all rows of sub-pixels having relatively large crosstalk need to have main display regions and crosstalk regions that are separately controlled. It can be determined based on manufacturing cost, complexity of control and other factors.

In a condition that one sub-pixel is provided with a plurality of crosstalk regions controlled separately from the main display region, the plurality of crosstalk regions may be controlled simultaneously, for example, in FIG. 3, all the crosstalk regions are connected with the data line D2, while in FIG. 5, all the crosstalk regions are connected with the gate line G2. However, each of the crosstalk regions of each sub-pixel may be controlled separately, although more data lines or gate lines are needed.

Based on the above, the present disclosure also provides an array substrate for use with the inclined optical grating 30. The array substrate includes: a base substrate (not shown); a plurality of data lines and a plurality of gate lines; and an array of sub-pixels formed by a plurality of sub-pixels and arranged on the base substrate, at least one sub-pixel having the above described pixel structure. The pixel structure has a shape of an approximate rectangle, and the crosstalk region includes at least one of the four corners of the rectangle and has a shape of a right angled triangle. The pixel structure is configured such that a hypotenuse of the right angled triangle is orientated in a direction that is the same as a direction in which the inclined optical grating is orientated.

In a 3D display based on the array substrate, through separating a region of a sub-pixel (i.e., the crosstalk region) where crosstalk between the sub-pixel and other sub-pixels may easily occur, from other regions of the sub-pixel and by separately controlling the main display region and the crosstalk region of the sub-pixel, the crosstalk region where crosstalk occurs between sub-pixels may be turned off, so as to prevent an adverse influence from the crosstalk region.

As described above, the array substrate may be controlled by two possible specific methods as follows:

As shown in FIG. 3, two data lines D1, D2 may be respectively connected to the main display region and the crosstalk region of a corresponding sub-pixel to control brightness of the main display region 10 and brightness of the crosstalk region 20 of the corresponding sub-pixel separately. In such a manner, crosstalk region of each sub-pixel or each crosstalk region may be controlled separately, although an aperture opening ratio of the sub-pixel is decreased due to the addition of one more data line.

As shown in FIG. 5, two gate lines G1, G2 may be respectively connected to main display regions 10 and crosstalk regions 20 of sub-pixels in a corresponding row of sub-pixels in parallel with the gate lines, so as to control brightness of the main display regions 10 and brightness of the crosstalk regions 20 of corresponding pixels respectively. In such a manner, a pixel may have a relatively large aperture opening ratio, although brightness of crosstalk region of each sub-pixel cannot be controlled arbitrarily.

The present disclosure also provides a display device comprising the above array substrate. The display device may be an OLED panel, a mobile phone, a tablet computer, a TV set, a display, a notebook computer, a digital photo frame, a navigator or any other products or component that have a display function.

Obviously, the display device can achieve the same technical effects as those of the array substrate as it includes the above array substrate.

The present disclosure also provides a method for controlling an array substrate comprising an array formed of a plurality of sub-pixels each having a pixel structure. The method includes steps of: dividing each of at least a part of the pixel structures into a main display region and a crosstalk region based on arrangement requirement for stereoscopic display; and controlling brightness of the main display region and brightness of the crosstalk region separately.

Based on the above method, in a 3D display, separate controls of the main display region and the crosstalk region of the sub-pixel may be realized through separating a region (i.e., the crosstalk region) of the sub-pixel where a crosstalk with other sub-pixels tends to occur from other regions of the sub-pixel, the crosstalk region of the sub-pixel where a crosstalk is generated may be turned off, so as to prevent an adverse influence from the crosstalk region.

In an embodiment of the present disclosure, as shown in FIG. 3, two data lines D1, D2 are used to separately control brightness of the main display region 10 and brightness of the crosstalk region 20. In such a manner, the crosstalk region 20 of each sub-pixel or each crosstalk region 20 may be controlled separately, although an aperture opening ratio of the sub-pixel is reduced due to the addition of one more data line.

Further, the method may include: keeping a crosstalk region of a pixel structure within a dead region of stereoscopic viewing being turned on. In such a manner, an image can also be seen in the dead region of stereoscopic viewing and can also provide a display effect although it is unclear, so as to improve a comfort level of a watcher.

In an embodiment of the present disclosure, as shown in FIG. 5, two gate lines G1, G2 may be connected to main display regions 10 and crosstalk regions 20 of sub-pixels in a corresponding row of sub-pixels in parallel with the gate lines, so as to control brightness of the main display regions 10 and brightness of the crosstalk regions 20 of corresponding pixels respectively. In such a manner, a pixel may have a relatively large aperture opening ratio although brightness of the crosstalk region 20 of each sub-pixel cannot be controlled arbitrarily.

Embodiments of the present disclosure have been described by taking a naked-eye stereoscopic display based on an optical parallax shielding optical grating as an example. It is to be noted that, technical solutions of the present disclosure may be also adaptable to naked-eye stereoscopic display technologies utilizing other optical components such as a cylindrical lens.

In the present disclosure, if a 2D display is needed, the main display region and the crosstalk region of the sub-pixel needs not to be controlled separately. Instead, they may have an identical brightness.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. An array substrate for naked-eye stereoscopic display, comprising at least one sub-pixel,
    wherein the sub-pixel comprises a main display region and a crosstalk region, and the main display region and the crosstalk region are configured such that brightness of the main display region and brightness of the crosstalk region are controlled separately; and
    wherein the array substrate further comprises a first gate line, a second gate line, a first data line, a second data line, a third data line, a fourth data line and a common electrode line, and the array substrate is configured such that:
        in a condition of the first gate line being on, a signal on the first data line is communicated to the main display region and the crosstalk region, and a signal on the common electrode is communicated to the main display region and the crosstalk region; and
        in a condition of the second gate line being on and the first gate line being off, a voltage on the common electrode line is applied to the crosstalk region via the fourth data line, the second gate line and the third data line.

2. The array substrate according to claim 1, wherein the sub-pixel is approximately in a shape of a rectangle, and the crosstalk region comprises at least one of four corners of the sub-pixel.

3. A display device, comprising the array substrate according to claim 2.

4. A method of controlling the array substrate of claim 2, comprising the following steps of:
    switching on the first gate line, such that the main display region and the crosstalk region are turned into bright regions; and
    switching off the first gate line and switching off the second gate line, such that the crosstalk region is turned into a dark region.

5. The method according to claim 4, wherein the method further comprising:
    keeping the crosstalk region of the sub-pixel located within a dead region of stereoscopic viewing being turned on, such that the crosstalk region is in a bright state.

6. The array substrate according to claim 1, wherein the array substrate comprises a plurality of sub-pixels, and the array substrate further comprises a base substrate, the plurality of sub-pixels are arranged on the base substrate into a sub-pixel array, and in a condition of performing a naked-eye stereoscopic display, images displayed by the sub-pixels are arranged in an inclined manner.

7. The array substrate according to claim 6, wherein the first gate line is connected to the main display region of each sub-pixel in a row of sub-pixels of the sub-pixel array arranged in a direction in parallel with the first gate line, and the second gate line is connected to the crosstalk region of each sub-pixel in the row of sub-pixels.

8. A display device, comprising the array substrate according to claim 7.

9. A method of controlling the array substrate of claim 7, comprising the following steps of:
    switching on the first gate line, such that the main display region and the crosstalk region are turned into bright regions; and
    switching off the first gate line and switching off the second gate line, such that the crosstalk region is turned into a dark region.

10. The method according to claim 9, wherein the method further comprising:
    keeping the crosstalk region of the sub-pixel located within a dead region of stereoscopic viewing being turned on, such that the crosstalk region is in a bright state.

11. A display device, comprising the array substrate according to claim 6.

12. A method of controlling the array substrate of claim 6, comprising the following steps of:
    switching on the first gate line, such that the main display region and the crosstalk region are turned into bright regions; and
    switching off the first gate line and switching off the second gate line, such that the crosstalk region is turned into a dark region.

13. The method according to claim 12, wherein the method further comprising:
    keeping the crosstalk region of the sub-pixel located within a dead region of stereoscopic viewing being turned on, such that the crosstalk region is in a bright state.

14. A display device, comprising the array substrate according to claim 1.

15. A method of controlling the array substrate of claim 1, comprising the following steps of:
    switching on the first gate line, such that the main display region and the crosstalk region are turned into bright regions; and
    switching off the first gate line and switching off the second gate line, such that the crosstalk region is turned into a dark region.

16. The method according to claim 15, the method further comprising:
    keeping the crosstalk region of the sub-pixel located within a dead region of stereoscopic viewing being turned on, such that the crosstalk region is in a bright state.

* * * * *